United States Patent
Zheng et al.

(10) Patent No.: US 12,150,195 B2
(45) Date of Patent: *Nov. 19, 2024

(54) INFORMATION REPORTING METHOD, RECEIVING METHOD, USER EQUIPMENT, AND NETWORK DEVICE

(71) Applicant: VIVO MOBILE COMMUNICATION CO.,LTD., Guangdong (CN)

(72) Inventors: Qian Zheng, Chang'an Dongguan (CN); Xiaodong Yang, Chang'an Dongguan (CN); Xiaowan Ke, Chang'an Dongguan (IN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,456

(22) Filed: Apr. 27, 2023

(65) Prior Publication Data

US 2023/0284318 A1    Sep. 7, 2023

Related U.S. Application Data

(63) Continuation of application No. 17/207,335, filed on Mar. 19, 2021, now Pat. No. 11,678,393, which is a
(Continued)

(30) Foreign Application Priority Data

Sep. 21, 2018    (CN) .......................... 201811109872.6

(51) Int. Cl.
*H04W 76/19* (2018.01)
*H04W 76/11* (2018.01)
(Continued)

(52) U.S. Cl.
CPC ............ *H04W 76/19* (2018.02); *H04W 76/11* (2018.02); *H04W 76/25* (2018.02); *H04W 76/27* (2018.02); *H04W 84/042* (2013.01)

(58) Field of Classification Search
CPC ..... H04W 76/11; H04W 76/19; H04W 76/20; H04W 76/25; H04W 76/27; H04W 76/30; H04W 84/042
See application file for complete search history.

(56) References Cited

U.S. PATENT DOCUMENTS 9,363,701 B2    6/2016   Jung et al.
2010/0118801 A1   5/2010   Yavuz et al.
(Continued)

FOREIGN PATENT DOCUMENTS

CN    103037400 A    4/2013
CN    103636257 A    3/2014
(Continued)

OTHER PUBLICATIONS

Ericsson, "Handling of AS security context at Resume after 2-step RNA," 3GPP TSG-RAN WG2 #102, R2-1807924, pp. 1-4, (May 21-25, 2018).
(Continued)

*Primary Examiner* — Jean A Gelin
(74) *Attorney, Agent, or Firm* — Brooks Kushman P.C.

(57) ABSTRACT

An information reporting method, a receiving method, user equipment, and a network device are provided. The information reporting method comprises: sending a RRC resume request message to a network device; receiving a first RRC message sent by the network device in response to the RRC resume request message; and sending a second RRC message in response to the first RRC message to the network device, wherein in a case that the user equipment is in an inactive mode, when a PLMN reselects to an EPLMN, or
(Continued)

when PLMN reselects to EPLMN and RNA update conditions are met, the second RRC message carries the identity of EPLMN.

20 Claims, 9 Drawing Sheets

Related U.S. Application Data continuation of application No. PCT/CN2019/103992, filed on Sep. 2, 2019.

(51) Int. Cl.
*H04W 76/25* (2018.01)
*H04W 76/27* (2018.01)
*H04W 84/04* (2009.01)

(56) References Cited

U.S. PATENT DOCUMENTS

| | | | |
|---|---|---|---|
| 2013/0003697 A1 | 1/2013 | Adjakple et al. | |
| 2014/0213194 A1 | 7/2014 | Feng et al. | |
| 2014/0213258 A1 | 7/2014 | Dahlen et al. | |
| 2014/0287756 A1 | 9/2014 | Yang | |
| 2014/0317456 A1 | 10/2014 | Kim et al. | |
| 2015/0065143 A1 | 3/2015 | Hsu et al. | |
| 2015/0173122 A1* | 6/2015 | Schliwa-Bertling | H04W 52/0235 370/311 |
| 2015/0257068 A1* | 9/2015 | Fang | H04W 92/20 455/436 |
| 2015/0373506 A1 | 12/2015 | Jung et al. | |
| 2018/0288689 A1 | 10/2018 | Liu | |
| 2018/0367303 A1* | 12/2018 | Velev | H04L 9/0891 |
| 2019/0357037 A1* | 11/2019 | Velev | H04W 8/04 |
| 2019/0357118 A1* | 11/2019 | Kim | H04W 48/06 |
| 2020/0053821 A1 | 2/2020 | Shih et al. | |
| 2020/0059884 A1 | 2/2020 | Chen et al. | |
| 2020/0120741 A1 | 4/2020 | Lindheimer et al. | |

FOREIGN PATENT DOCUMENTS

| | | | |
|---|---|---|---|
| CN | 106304019 A | 1/2017 | |
| CN | 108040367 A | 5/2018 | |
| JP | 2017060182 A | 3/2017 | |
| WO | 2017/190953 A1 | 11/2017 | |
| WO | 2018/131956 A1 | 7/2018 | |
| WO | 2018/142207 A1 | 8/2018 | |

OTHER PUBLICATIONS

Intel Corporation, "Open issues on E-UTRA connected to 5GC for Inactive," 3GPP TSG RAN WG2 Meeting #103, R2-1811656, pp. 1-12, (Aug. 20-24, 2018).

RAN WG2, "LS on inclusion of selected PLMN into the complete message," 3GPP TSG-RAN WG2 Meeting #103, R2-1813424, pp. 1-2, (Aug. 20-24, 2018).

Samsung, "LS on inclusion of selected PLMN into the complete message," 3GPP TSG-RAN WG2 Meeting #103, R2-1813216, pp. 1-2, (Aug. 20-24, 2018).

Samsung, "On selecting a new PLMN in RRC_Inactive," 3GPP TSG-RAN WG2 Meeting #103bis, R2-1813625, pp. 1-2, (Oct. 8-12, 2018).

Samsung, "Discussion on selecting EPLMN in RRC_INACTIVE state," 3GPP TSG-CT WG1 Meeting #112bis, C1-186504, pp. 1-4, (Oct. 15-19, 2018).

Samsung, "On selecting a new equivalent PLMN in RRC_Inactive," 3GPP TSG-RAN WG2 Meeting #104, R2-1816289, pp. 1-3, (Nov. 12-16, 2018).

Written Opinion of the International Searching Authority dated Apr. 1, 2021 as received in Application No. PCT/CN2019/103992.

CN Office Action dated Dec. 1, 2020 as received in Application No. 201811109872.6.

Japanese Office Action dated Jun. 7, 2022 as received in application No. 2021-516370.

Qualcomm Incorporated, "Change Request, Miscellaneous Corrections" 3GPP TSG-RAN2#103 R2-1811861 Gothenburg, Sweden, Aug. 20-24, 2018.

Qualcomm Incorporated "Discussion paper on PLMN mismatch during 5GMM-Connected mode with RRC inactive Indication" 3GPP TSG CT WG1 Meeting #112bis C1-186351 Vilnius (Lithuania), Oct. 15-19, 2018.

Ericsson, "Size of MSG3 in NR" 3GPP TSG-RAN WG2 #101 Tdoc R2-1802638 Athens, Greece, Feb. 26-Mar. 2, 2018 (Revision of R2-1800381).

LG Electronics Inc. "Using spare bits in Establishment Cause and Resume Cause" 3GPP TSG-RAN WG2 Nr AH1807 Meeting R2-1810725 Montreal, Canada, Jul. 2-6, 2018.

Nokia, "Consideration on RRC_Inactive state handling" 3GPP TSG-RANn WG2 Meeting #103 R2-1812397 Gothenburg, Sweden, Aug. 20-24, 2018NPL.

Non-Final Office Action dated May 24, 222 as receive in U.S. Appl. No. 17/207,335.

\* cited by examiner

Receive a third RRC message that carries the identity of EPLMN when PLMN reselects to EPLMN, or PLMN reselects to EPLMN and RNA update conditions are met in a case that user equipment is in an inactive mode — 901
FIG. 9
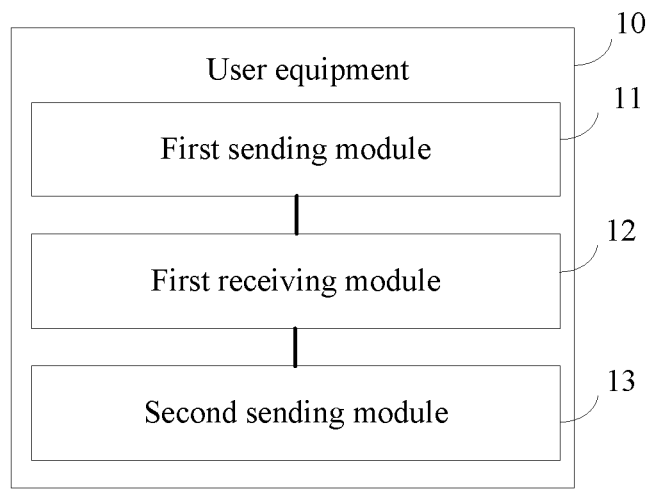
FIG. 10
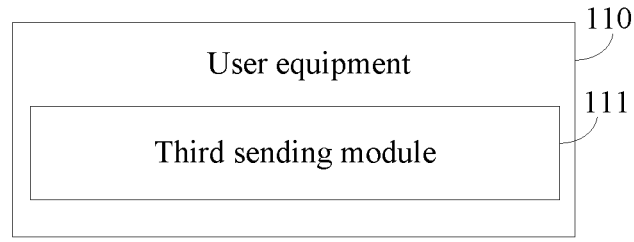
FIG. 11

INFORMATION REPORTING METHOD, RECEIVING METHOD, USER EQUIPMENT, AND NETWORK DEVICE

CROSS-REFERENCE OF RELATED APPLICATION

The application is a continuation of U.S. patent application Ser. No. 17/207,335 filed on Mar. 19, 2021, which is a continuation of PCT Application No. PCT/CN2019/103992 filed on Sep. 2, 2019, which claims priority to Chinese patent No. 201811109872.6 filed in China on Sep. 21, 2018, all of which are incorporated herein by reference in their entireties.

TECHNICAL FIELD

The present disclosure relates to the field of communications technologies, and in particular, to an information reporting method, a receiving method, user equipment, and a network device.

BACKGROUND

An inactive terminal such as User Equipment (UE), where the RAN Notification Area (RNA) update conditions are met, may initiate a RNA update process, referred to as RNAU Process. RNA update conditions can be a periodic RNAU timer timeout, or UE moving out configured RNA area.

In RNAU process, UE may initiate an RRC (Radio Resource Control) Resume Procedure to a base station. Specifically, when initiates an RRC Resume Procedure, UE may firstly send a message of RRC Resume Request to the base station, which may carry a cause value which should be set as RNAU so as to indicate to the base station that related RRC process is initiated due to UE meeting the RNA update conditions; then, after receiving the RRC Resume Procedure message from UE, the base station replies to UE an RRC Release message with suspend configuration information carried, indicating UE to stay inactive mode of RRC, and updating related parameter configuration of Inactive UE through the suspend configuration information, including RNA configuration information.

In addition, when a Public Land Mobile Network (PLMN) reselects to an equivalent PLMN (EPLMN) in inactive UE, it hopes to support UE to report the identity of reselected EPLMN to the base station to realize effective control of UE by network. Whereas, related technologies is that when the condition simultaneously occurs in inactive UE that PLMN reselects to EPLMN and RNA update conditions are satisfied, as MSG4 (RRC Release with suspend configuration) replied by the base station in RNAU Process indicates UE to stay inactive, therefore such UE will not send a message of RRC Resume Complete, causing the failure of reporting reselected EPLMN to the base station.

SUMMARY

The present disclosure provides an information reporting method, a receiving method, user equipment, and a network device to solve the problem that when PLMN reselects to EPLMN and RNA update conditions are satisfied simultaneously in inactive UE, which fails to report the reselection of EPLMN to a network device.

According to a first aspect, an embodiment of the present disclosure provides an information reporting method, applied to user equipment and including:
sending an RRC Resume Request message to a network device;
receiving a first RRC message sent by the network device in response to the RRC Resume Request message; and
sending a second RRC message in response to the first RRC message to the network device, where in a case that user equipment is in an inactive mode, when PLMN reselects to EPLMN, or PLMN reselects to EPLMN and RNA update conditions are met, the second RRC message carries the identity of EPLMN.

According to a second aspect, an embodiment of the present disclosure provides an information reporting method, applied to user equipment and including:
in a case that user equipment is in an inactive mode, when PLMN reselects to EPLMN, or PLMN reselects to EPLMN and RNA update conditions are met, the second RRC message carries the identity of EPLMN.

According to a third aspect, an embodiment of the present disclosure provides an information receiving method, applied to a network device and including:
receiving an RRC Resume Request message sent by user equipment;
sending a first RRC message in response to the RRC Resume Request message to the user equipment; and
receiving a second RRC message sent by the user equipment in response to the first RRC message, where
in a case that user equipment is in an inactive mode, when PLMN reselects to EPLMN, or PLMN reselects to EPLMN and RNA update conditions are met, the second RRC message carries the identity of EPLMN.

According to a fourth aspect, an embodiment of the present disclosure provides an information receiving method, applied to a network device and including:
receiving a third RRC message that carries the identity of EPLMN when PLMN reselects to EPLMN, or PLMN reselects to EPLMN and RNA update conditions are met in a case that user equipment is in an inactive mode.

According to a fifth aspect, an embodiment of the present disclosure provides user equipment, including:
a first sending module, configured to send an RRC Resume Request message to a network device;
a first receiving module, configured to receive a first RRC message by the network device in response to the RRC Resume Request message; and
a second sending module, configured to send a second RRC message in response to the first RRC message to the network device, where in a case that user equipment is in an inactive mode, when PLMN reselects to EPLMN, or PLMN reselects to EPLMN and RNA update conditions are met, the second RRC message carries the identity of EPLMN.

According to a sixth aspect, an embodiment of the present disclosure provides user equipment, including:
a third sending module, configured to send a third RRC message that carries the identity of EPLMN to a network device when PLMN reselects to EPLMN, or PLMN reselects to EPLMN and RNA update conditions are met in a case that user equipment is in an inactive mode.

According to a seventh aspect, an embodiment of the present disclosure provides a network device, including:
a second receiving module, configured to receive an RRC Resume Request message from user equipment;

a fourth sending module, configured to send a first RRC message corresponding to the RRC Resume Request message to the user equipment; and a third receiving module, configured to receive a second RRC message sent by the user equipment in response to the first RRC message, where in a case that user equipment is in an inactive mode, when PLMN reselects to EPLMN, or PLMN reselects to EPLMN and RNA update conditions are met, the second RRC message carries the identity of EPLMN.

According to an eighth aspect, an embodiment of the present disclosure provides a network device, including:

a fourth receiving module, configured to receive a third RRC message that carries the identity of EPLMN when PLMN reselects to EPLMN, or PLMN reselects to EPLMN and RNA update conditions are met in a case that user equipment is in an inactive mode.

According to a ninth aspect, an embodiment of the present disclosure further provides user equipment, including a memory, a processor, and a program stored in the memory and executable on the processor, where the program, when executed by the processor, implements steps of the information reporting method applied to user equipment.

According to a tenth aspect, an embodiment of the present disclosure further provides a network device, including a memory, a processor, and a program stored in the memory and executable on the processor, where the program, when executed by the processor, implements steps of the information reporting method applied to a network device.

According to an eleventh aspect, an embodiment of the present disclosure further provides a computer readable storage medium, storing a computer program, where the program, when executed by the processor, implements steps of the information reporting method applied to user equipment, or of the information receiving method applied to a network device.

In the embodiments of this disclosure, on one hand, an RRC Resume Procedure is initiated through user equipment, when PLMN reselects to EPLMN, or PLMN reselects to EPLMN and RNA update conditions are met, user equipment may report the identity of reselected EPLMN by RRC information, so as to report the identity of reselected EPLMN to the network device even though PLMN reselects to EPLMN and RNA update conditions are met simultaneously in a case that user equipment is in an inactive mode, namely, in the case of any reselection of PLMN to EPLMN, the identity of reselected EPLMN can be reported so as to ensure the network device may timely obtain the identity of reselected EPLMN to ensure related communication performance.

On the other hand, when PLMN reselects to EPLMN, or PLMN reselects to EPLMN and RNA update conditions are met at the same time in a case that user equipment is in an inactive mode, it can be realized that the identity of reselected EPLMN is reported by an RRC message directly, so as to reduce signaling overheads, ensure communication performance under the condition of meeting the report requirements of identity of reselected EPLMN.

BRIEF DESCRIPTION OF DRAWINGS

To mode the technical solutions in the embodiments of the present disclosure more clearly, the following will briefly introduce the accompanying drawings required herein. Notably, the drawings in the following description are merely some embodiments of the present disclosure, for a person of ordinary skill in the art, other accompanying drawings may also be obtained without any creative efforts based on those drawings.

FIG. 9 is a second flowchart of an information receiving method according to an embodiment of the present disclosure;

FIG. 10 is a first schematic diagram of user equipment according to an embodiment of the present disclosure;

FIG. 11 is a second schematic diagram of user equipment according to an embodiment of the present disclosure;

DESCRIPTION OF EMBODIMENTS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

Figure 1:
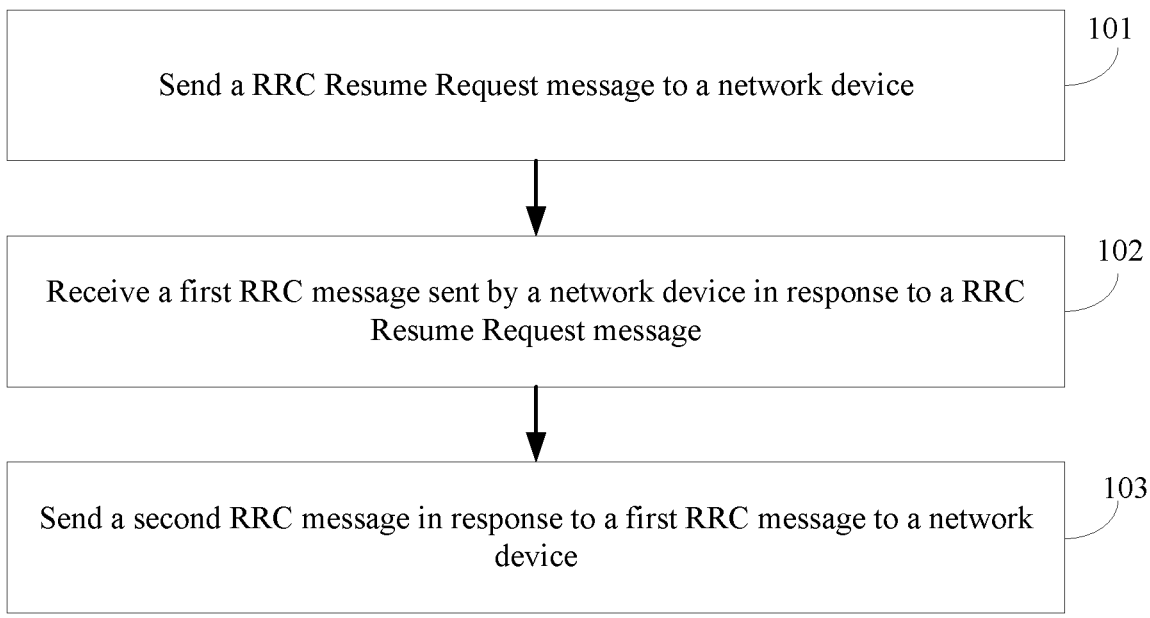
FIG. 1 is a first flowchart of an information reporting method according to an embodiment of the present disclosure.

As shown in FIG. 1, an embodiment of the present disclosure provides an information reporting method, applied to user equipment, and the method includes the following steps:

Step 101: Send an RRC Resume Request message to a network device.

It's understandable that the user equipment is inactive when sending an RRC Resume Request message. Before initiating an RRC Resume Procedure, the user equipment may monitor whether PLMN selects EPLMN, and RNA update conditions are satisfied. And the precondition for user equipment initiating an RRC Resume Procedure can be any of the following: PLMN selects EPLMN, RNA update conditions are satisfied and PLMN selects EPLMN simultaneously.

Step 102: Receive a first RRC message sent by a network device in response to an RRC Resume Request message.

It can be interpreted as after receiving an RRC Resume Request message sent by user equipment, a network device may reply a first RRC message in response to the RRC Resume Request message to the user equipment.

In this specific embodiment of the present disclosure, based on the protocol or other preset conditions, the first RRC message can be a present RRC message, such as an RRC Resume message or RRC release message, or be a redefined RRC message, such as New RRC message_1.

It should be noted that, when the first RRC message is an RRC release message, to ensure that user equipment may report an identity of reselected EPLMN, the RRC release message may carry suspend configuration information including wireless resource configuration information, which may indicate resources that are occupied by a second RRC message so that the user equipment sends a second RRC message by the indicting resources.

Step 103: Send a second RRC message in response to a first RRC message to a network device.

In a case that user equipment is in an inactive mode, when PLMN reselects to EPLMN, or PLMN reselects to EPLMN and RNA update conditions are met at the same time, the second RRC message carries the reselected identity of EPLMN. Sending a second RRC message in response to a first RRC message to a network device can be interpreted as after receiving a first RRC message sent by a network device, user equipment may reply a second RRC message in response to a first RRC message to the network device.

In this specific embodiment of the present disclosure, based on the protocol or other preset conditions, the second RRC message can be a present RRC message, such as an RRC Resume Complete message or be a redefined RRC message, such as New RRC message_2 or New RRC message_3.

For example, in specific implementation, the first RRC message can be an RRC Resume message, and the second RRC message be an RRC Resume Complete message at the same time; or, the first RRC message can be an RRC Release message, and the second RRC message be New RRC message_2 at the same time; or the first RRC message can be New RRC message_1, and the second RRC message be New RRC message_3 in the meantime.

In the embodiments of this present disclosure, an RRC Resume Procedure is initiated through user equipment, when PLMN reselects to EPLMN, or PLMN reselects to EPLMN and RNA update conditions are met, user equipment may report the identity of reselected EPLMN by RRC information, so as to report the identity of reselected EPLMN to the network device even though PLMN reselects to EPLMN and RNA update conditions are met simultaneously in a case that user equipment is in an inactive mode, namely, in the case of any reselection of PLMN to EPLMN, the identity of reselected EPLMN can be reported so as to ensure the network device may timely obtain the identity of reselected EPLMN to ensure related communication performance.

In this specific embodiment of the present disclosure, when the RRC Resume Request message is sent by user equipment when PLMN reselects to EPLMN, or PLMN reselects to EPLMN and RNA update conditions are met at the same time, the RRC Resume Request message may carry a first cause value, which may be used to indicate PLMN reselecting to EPLMN in user equipment, namely, a corresponding RRC Resume Procedure is initiated due to PLMN reselecting to EPLMN, or PLMN reselecting to EPLMN and RNA update conditions being met, namely, a corresponding RRC Resume Procedure is initiated due to PLMN reselecting to EPLMN and RNA update conditions being met.

It should be noted that the first cause value can be selected as a new cause value. When a network device replies a first RRC message in response to an RRC Resume Request message to user equipment, it may determine the relevant first RRC message based on the first cause value which is carried in the RRC Resume Request message. For example, if the first cause value indicates PLMN reselecting to EPLMN in user equipment, the network device may determine the first RRC message is an RRC Resume message, RRC Release message or New RRC message_1; or, if the first cause value indicates PLMN reselecting to EPLMN and RNA update conditions being met in the meantime in user equipment, the network device may determine the first RRC message is an RRC Resume message, RRC Release message or New RRC message_1.

Further, the first cause value can be determined by Non-Access Stratum (NAS) in user equipment, and be provided to Access Stratum (AS) while providing identity of reselected EPLMN to it; or, the first cause value can be determined after AS in user equipment provides a reselected identity of EPLMN at NAS to AS, namely, after NAS provides a reselected identity of EPLMN to AS, the first cause value is set by AS.

Or, when the RRC Resume Request message is sent when PLMN reselecting to EPLMN or PLMN reselecting to EPLMN and RNA update conditions being met in the meantime in user equipment, the RRC Resume Request message may carry a second cause value, which can indicate that user equipment has uplink data transmission or uplink signaling transmission.

It should be noted that, the second cause value may reuse the present cause value, for example, the second cause value can be set as mo-singalling or mo-data. The network device after receiving the RRC Resume Request message carrying a second cause value, may reply an RRC Resume message in response to the RRC Resume Request message to the user equipment, and further, the user equipment may reply an RRC Resume Complete message in response to the RRC Resume message to the network device.

Further, the second cause value can be determined by NAS in user equipment, and be provided to AS while providing an identity of reselected EPLMN to it; or, the second cause value can be determined by NAS in user equipment, and is provided to AS while providing a reselected identity of EPLMN to AS, meanwhile, triggers NAS signaling process, and the NAS signaling process can be selected as a mobile registration update process, or core network track area update process, etc; or, the second cause value can be determined by AS in user equipment after NAS provides an identity of reselected EPLMN to AS, namely, after NAS provides a reselected identity of EPLMN to AS, the second cause value is set by AS.

Or, when the RRC Resume Request message is sent when PLMN reselecting to EPLMN or PLMN reselecting to EPLMN and RNA update conditions being met in the meantime in user equipment, the RRC Resume Request message may carry a second cause value, which can indicate whether PLMN reselecting to EPLMN in user equipment.

It should be noted that, the indication information can be selected as 1 bit identification information. When a network device replies a first RRC message in response to an RRC Resume Request message to user equipment, it can determine the corresponding first RRC message based on the indication information which is carried in the RRC Resume Request message. For example, if the indication information indicates PLMN reselecting to EPLMN in user equipment, the network device can determine the first RRC message as an RRC Resume message, RRC Release message or New RRC message_1.

In this specific embodiment of the present disclosure, considering the protocol requirements, when a PLMN list of network device broadcast includes Registered PLMN (RPLMN), the user equipment can't reselect any other PLMN, namely, when the list excludes the RPLMN of user equipment, the user equipment might reselect EPLMN, therefore, it may by means of RNAU Process of relevant technologies, select an RRC message in response to an RRC Resume Request message through the user equipment context by network device, so that the user equipment may report the reselected identity of EPLMN when PLMN reselecting to EPLMN in it.

Optionally, when the RRC Resume Request message is sent by user equipment when RNA update conditions are met, the first RRC message can be sent on the condition that the network device judges the list of PLMN of cell broadcast to be restored excludes RPLMN of the user equipment. Further, the first RRC message can be an RRC Resume message, and the second RRC message can be an RRC Resume Complete message.

It can be understood that, the same network device, such as a base station, may have several communities, while each one may broadcast its own PLMN list, therefore, a network device may, based on an RRC Resume Request message received, judge corresponding communities to be restored of relevant RRC Resume Procedures.

While judging whether the PLMN list of cell broadcast to be restored includes RPLMN of user equipment, a network device may send an RRC Release message to the user equipment, which keeps an RRC inactive mode at the moment. In this case, the user equipment will not reselect any other PLMN, namely, will not reselect EPLMN, therefore, there is no need to report.

In this way, an RRC Resume message is sent by network device for determining whether a broadcast PLMN list includes RPLMN, it can be realized that the identity of reselected EPLMN is reported when PLMN reselects to EPLMN.

In the embodiment of the present disclosure, the user equipment can report the identity of reselected EPLMN by the RRC Resume Procedure initiated, it can also initiate a new RRC Procedure to report, detailed as follows.

Figure 2:
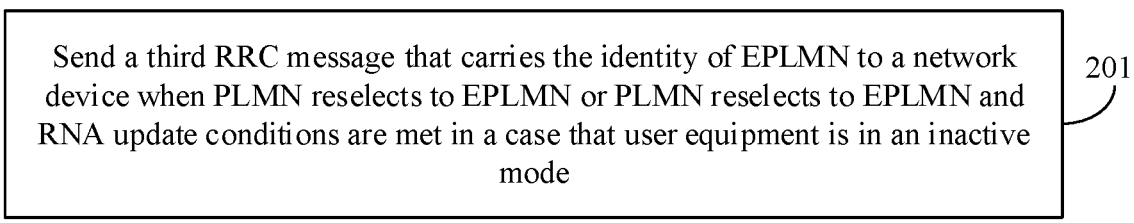
FIG. 2 is a second flowchart of an information reporting method according to an embodiment of the present disclosure.

As shown in FIG. 2, the embodiment of the present disclosure also provides an information reporting method, applied in user equipment, and the method includes the following steps:

Step 201: Send a third RRC message that carries the identity of EPLMN to a network device when PLMN reselects to EPLMN or PLMN reselects to EPLMN and RNA update conditions are met in a case that user equipment is in an inactive mode.

The third RRC message can be selected as a new RRC message, such as New RRC message_4. To accurately identify and verify, the third RRC message can carry an identity of EPLMN, and at least one of the following as well:
user equipment identifier, message authentication code-Integrity (MAC-I), and truncated MAC-I.

It can be understood that, in specific implementation, the third RRC message may carry either MAC-I or truncated MAC-I. And by MAC-I or truncated MAC-I, the user equipment identifier can be verified for accurate identification.

The user equipment identifier can be at least one of the following: Inactive-radio network temporary identifier (I-RNTI), resume ID, UE context ID, and 5G S-Temporary Mobile Subscription Identifier (5G-S-TMSI).

Optionally, after step 201, the method further includes:
User equipment receives a fourth RRC message or RRC Release message from the network device in response to the third RRC message.

The fourth RRC message can be selected as a new RRC message, such as New RRC message_5. In this way, by means of a fourth RRC message or RRC Release message, the user equipment can learn the identity of reselected EPLMN obtained by the network device to ensure relevant communication performance.

It is understandable that the new RRC Procedure in the embodiments of the present disclosure can be a procedure of realization (one step process) by using a third RRC message (such as New RRC message_4), or by using a third RRC message (such as New RRC message_4) and a present RRC Release message (MSG4), or by using a third RRC message (such as New RRC message_4) and a fourth RRC message (New RRC message_5).

In this way, when PLMN reselects to EPLMN, or PLMN reselects to EPLMN and RNA update conditions are met at the same time in a case that user equipment is in an inactive mode, it can be realized that the identity of reselected EPLMN is reported by an RRC message directly, so as to reduce signaling overheads, ensure communication performance under the condition of meeting the report requirements of identity of reselected EPLMN.

The following describes the information reporting process from embodiment 1 to 5 of the present disclosure in details with reference to FIG. 3-7.

Embodiment 1

Under embodiment 1, inactive user equipment may report an identity of reselected EPLMN by initiating an RRC Resume Procedure, while the initiation, a corresponding RRC Resume Request messages may carry new cause values. The network device in the embodiment can be a base station, NG-RAN node, etc.

Figure 3:
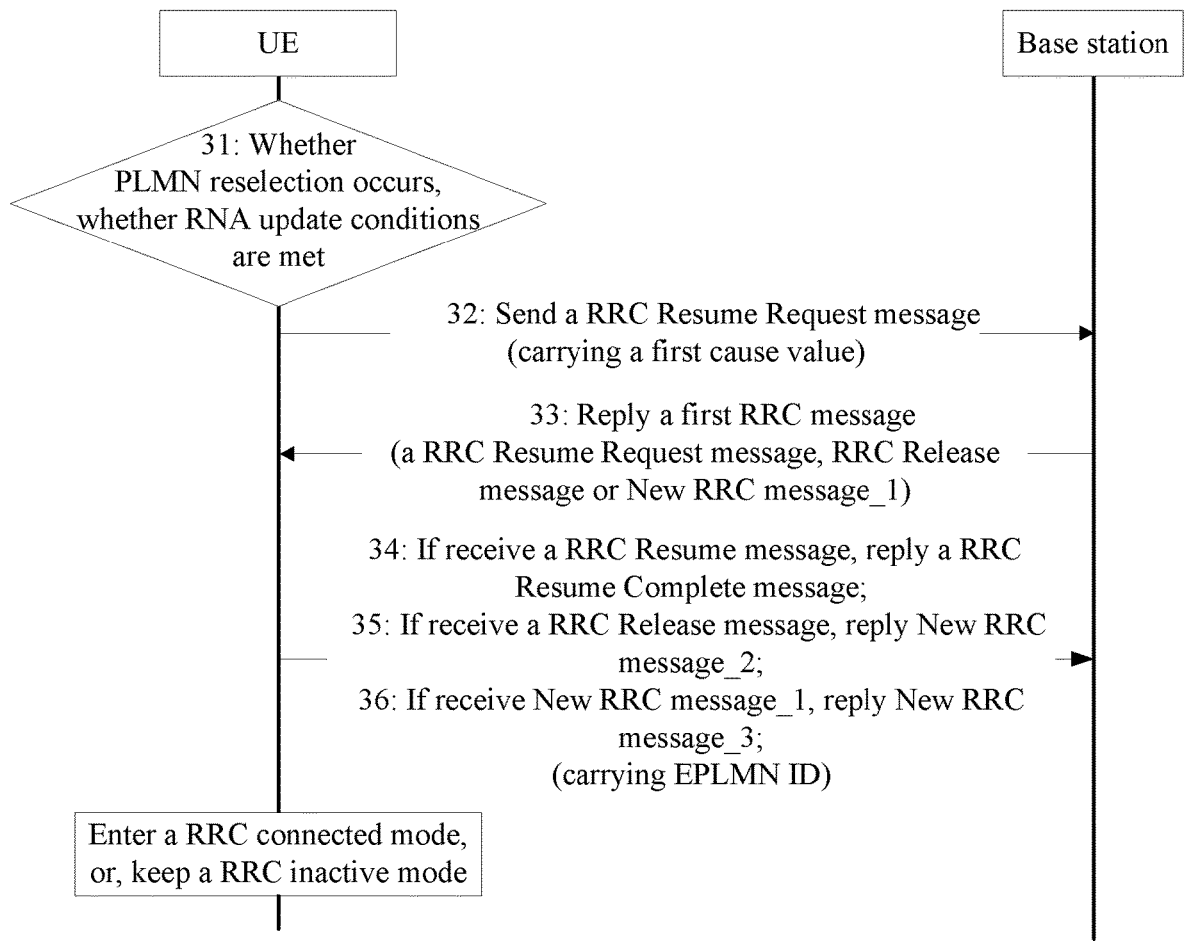
FIG. 3 is a flowchart of an information reporting method according to a first specific embodiment of the present disclosure.

As shown in FIG. 3, a corresponding information reporting procedure may include the following steps:

Step 31: Inactive UE monitors whether reselection of PLMN occurs, and whether RNA update conditions are met, where when PLMN reselects to EPLMN, or PLMN reselects to EPLMN and RNA update conditions are met simultaneously, UE may initiate an RRC Resume Procedure to a base station.

Step 32: When PLMN reselects to EPLMN, or PLMN reselects to EPLMN and RNA update conditions are met simultaneously, UE sends an RRC Resume Request message to a base station, where the request message may carry a first cause value, which can be used to indicate PLMN reselecting to EPLMN, or PLMN reselecting to EPLMN and RNA update conditions being met simultaneously in UE.

Optionally, the description of the first cause value may refer to that in the above FIG. 1 of the embodiment. Details are not described herein.

Step 33: After receiving an RRC Resume Request message, a base station reads the first cause value therein, and replies to UE a first RRC message in response to the RRC Resume Request message; where, the first RRC message can be selected as an RRC Resume message, RRC release message or New RRC message_1.

Step 34: If receiving an RRC Resume message, UE replies an RRC Resume Complete message in response to an RRC Resume message to the base station; where, the RRC Resume Complete message carries the identity of EPLMN (PLMN ID), UE enters an RRC connected mode.

Step 35: If receiving an RRC Release message, and the message carries suspend configuration information including a wireless resource configuration information, which may indicate wireless resources, then UE replies New RRC message_2 in response to an RRC Resume message to the base station; where, the New RRC message_2 carries EPLMN ID, and UE keeps an RRC inactive mode.

Step 36: If receiving New RRC message_1, then UE replies New RRC message_3 in response to an RRC Resume message to the base station; where, the New RRC message_3 carries EPLMN ID, and UE keeps an RRC inactive mode.

Embodiment 2

Under embodiment 2, inactive user equipment may report an identity of reselected EPLMN by initiating an RRC Resume Procedure, while the initiation, a corresponding RRC Resume Request messages may carry new cause values. The network device in the embodiment can be a base station, NG-RAN node, etc.

Figure 4:
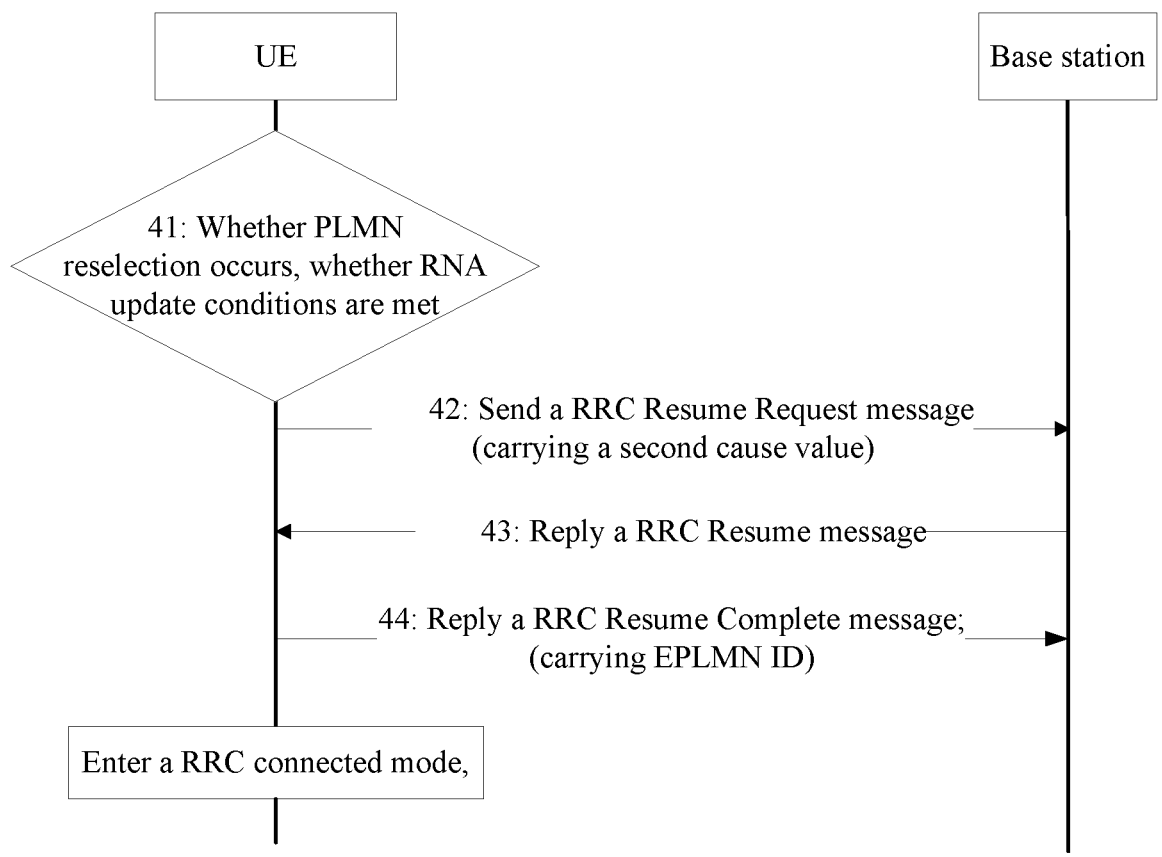
FIG. 4 is a flowchart of an information reporting method according to a second specific embodiment of the present disclosure.

As shown in FIG. 4, a corresponding information reporting procedure may include the following steps:

Step 41: Inactive UE monitors whether reselection of PLMN occurs, and whether RNA update conditions are met, where when PLMN reselects to EPLMN, or PLMN reselects to EPLMN and RNA update conditions are met simultaneously, UE may initiate an RRC Resume Procedure to a base station.

Step 42: When PLMN reselects to EPLMN, or PLMN reselects to EPLMN and RNA update conditions are met simultaneously, UE sends an RRC Resume Request message to a base station, where the request message may carry a second cause value, which can be used to indicate that UE has uplink data transmission or uplink signaling transmission, which can be set as mo-signaling or mo-data.

Optionally, the description of the second cause value may refer to that in the above FIG. 1 of the embodiment. Details are not described herein.

Step 43: After receiving an RRC Resume Request message, a base station reads the second cause value therein, and replies to UE a first RRC message in response to the RRC Resume Request message.

Step 44: After receiving an RRC Resume message, UE replies an RRC Resume Complete message in response to an RRC Resume message to the base station; where, the RRC Resume Complete message carries the EPLMN ID, and UE enters an RRC connected mode.

Embodiment 3

Under embodiment 3, inactive user equipment may report an identity of reselected EPLMN by initiating an RRC Resume Procedure, while the initiation, a corresponding RRC Resume Request messages may carry indication information for indicating whether PLMN reselecting to EPLMN. The network device in the embodiment can be a base station, NG-RAN node, etc.

Figure 5:
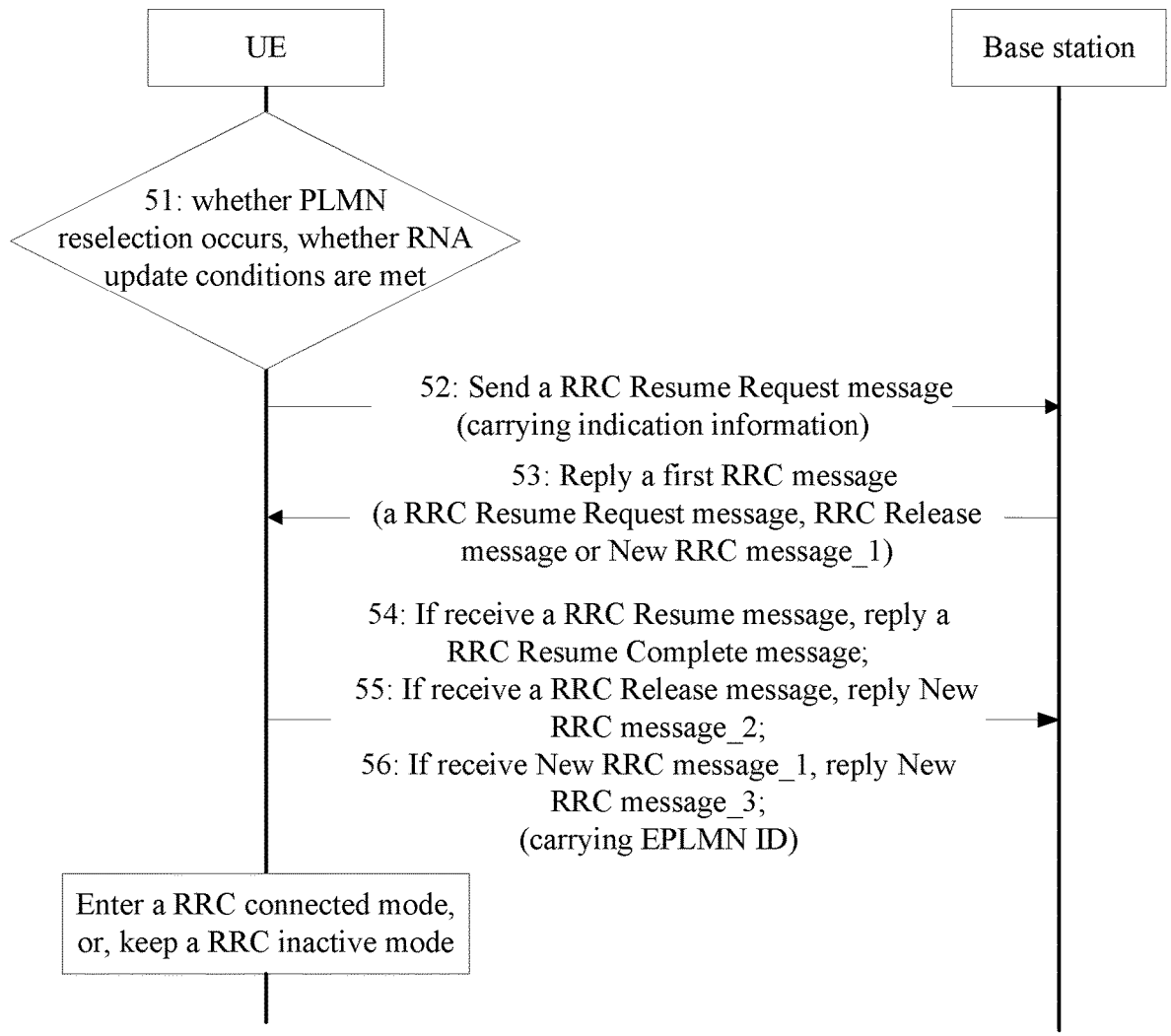
FIG. 5 is a flowchart of an information reporting method according to a third specific embodiment of the present disclosure.

As shown in FIG. 5, a corresponding information reporting procedure may include the following steps:

Step 51: Inactive UE monitors whether reselection of PLMN occurs, and whether RNA update conditions are met, where when PLMN reselects to EPLMN, or PLMN reselects to EPLMN and RNA update conditions are met simultaneously, UE may initiate an RRC Resume Procedure to a base station.

Step 52: When PLMN reselects to EPLMN, or PLMN reselects to EPLMN and RNA update conditions are met simultaneously, UE sends an RRC Resume Request message to a base station, where the request message may carry indication information for indicating whether PLMN reselecting to EPLMN, and the information can be 1 bit identification information.

Step 53: After receiving an RRC Resume Request message, a base station reads the cause value and 1 bit identification information therein, and replies to UE a first RRC message in response to the RRC Resume Request message, where the first RRC message can be selected as an RRC Resume Request message, RRC Release message or New RRC message_1.

Step 54: If receiving an RRC Resume message, UE replies an RRC Resume Complete message in response to an RRC Resume message to the base station; where, the RRC Resume Complete message carries the EPLMN ID, and UE enters an RRC connected mode.

Step 55: If receiving an RRC Release message, and the message carries suspend configuration information including wireless resource configuration information, which may indicate wireless resources, then UE replies New RRC message_2 in response to an RRC Resume message to the base station; where, the New RRC message_2 carries EPLMN ID, and UE keeps an RRC inactive mode.

Step 56: If receiving New RRC message_1, then UE replies New RRC message_3 in response to an RRC Resume message to the base station; where, the New RRC message_3 carries EPLMN ID, and UE keeps an RRC inactive mode.

Embodiment 4

Under embodiment 4, inactive user equipment may report an identity of reselected EPLMN by initiating an RRC Resume Procedure, while the procedure may adopt an RNAU mechanism in corresponding technologies. The network device in the embodiment can be a base station, NG-RAN node, etc.

Figure 6:
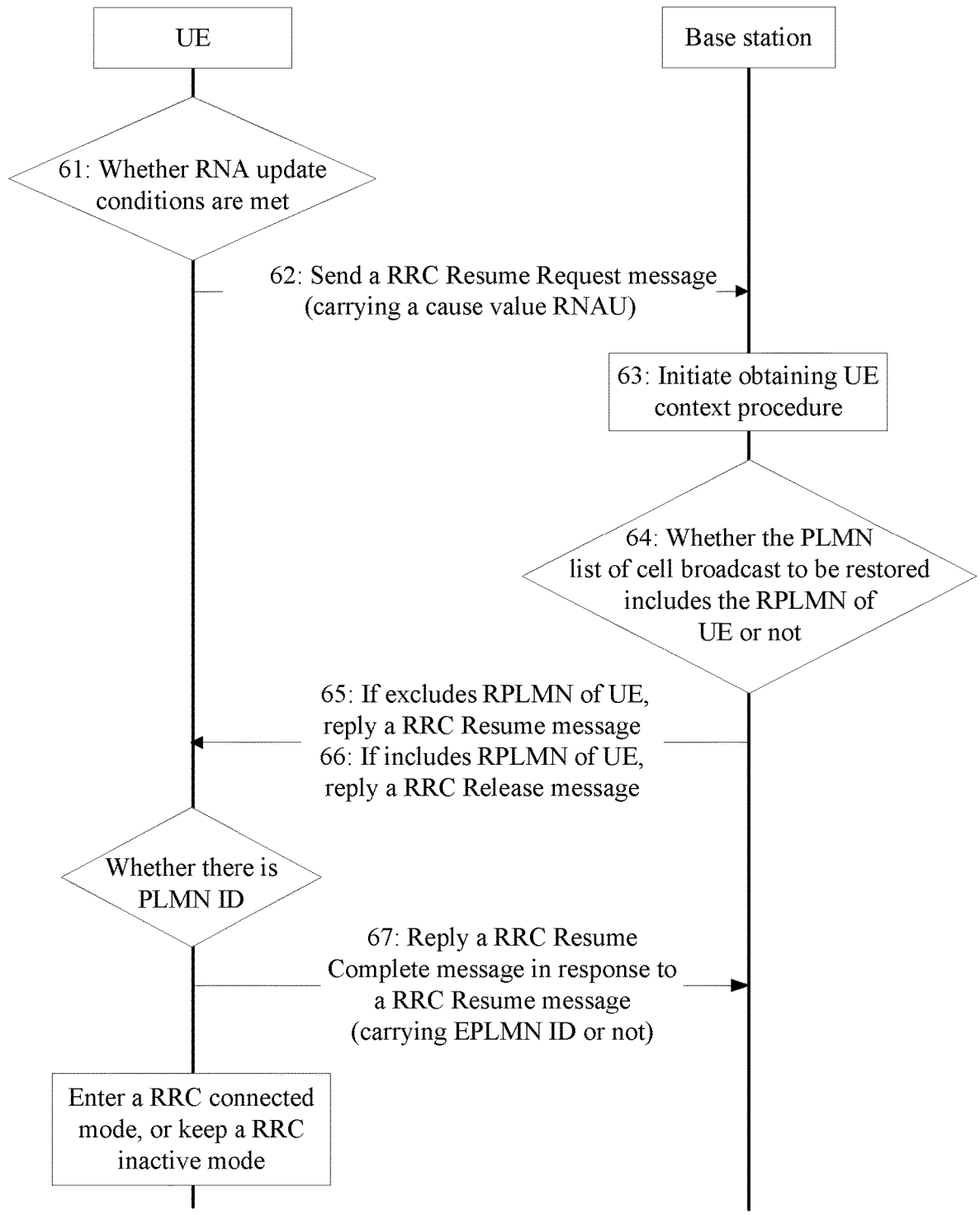
FIG. 6 is a flowchart of an information reporting method according to a fourth specific embodiment of the present disclosure.

As shown in FIG. 6, a corresponding information reporting procedure may include the following steps:

Step 61: Inactive UE monitors whether RNA update conditions are met, where when RNA update conditions are met, UE may initiate an RRC Resume Procedure to a base station.

Step 62: When RNA update conditions are met, UE sends an RRC Resume Request message to the base station, where the Request message may carry a cause value, which can be set as RNAU.

Step 63: After receiving an RRC Resume Request message, a base station initiates obtaining UE context procedure, where the UE context obtained may include a PLMN list of broadcast of the base station.

Step 64: The base station judges whether the PLMN list of cell broadcast to be restored includes the RPLMN of UE.

Step 65: If excluding the RPLMN of UE, the base station replies an RRC Resume message in response to an RRC Resume Request message to UE.

Step 66: If including the RPLMN of UE, the base station replies an RRC Release message (MSG4) in response to an RRC Resume Request message to UE, where the MSG4 may carry suspend configuration information (same as the mechanism of corresponding technologies), and UE keeps an RRC inactive mode.

Step 67: After receiving an RRC Resume message, UE replies an RRC Resume Complete message in response to an RRC Resume message to the base station, where when initiating step 62, NAS in UE provides a reselected PLMN ID to AS, then the RRC Resume Complete message carries EPLMN ID, otherwise carries no EPLMN ID; UE enters an RRC connected mode.

Embodiment 5

Figure 7:
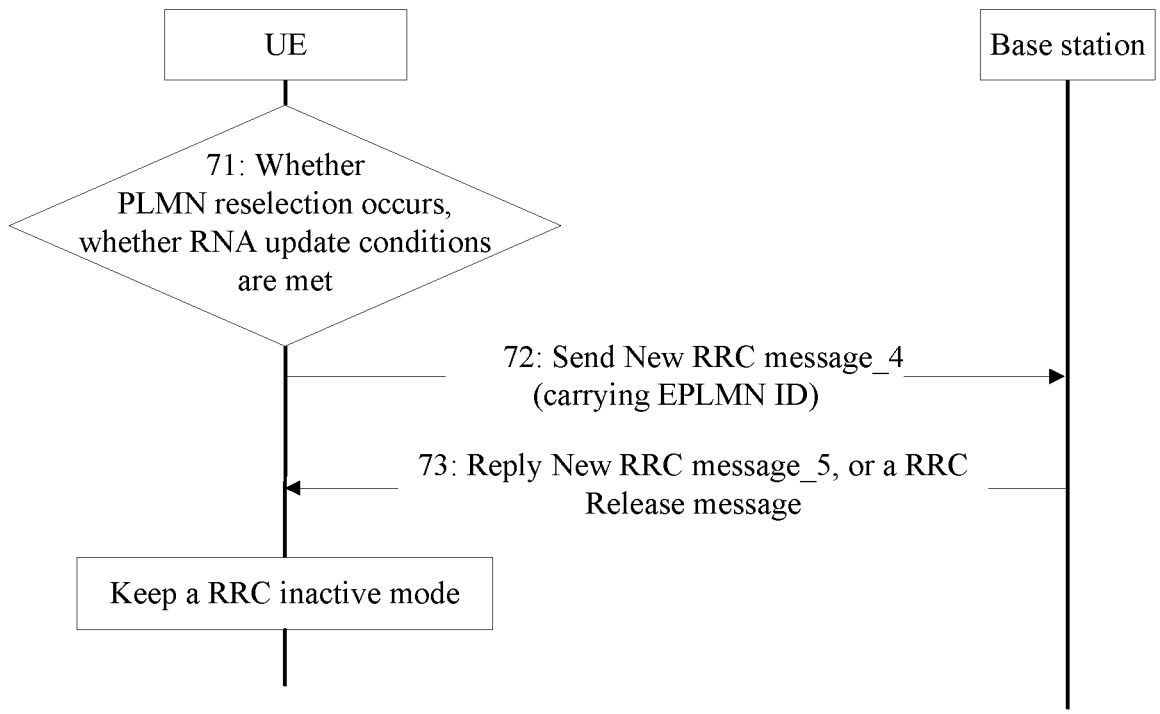
FIG. 7 is a flowchart of an information reporting method according to a fifth specific embodiment of the present disclosure.

Under embodiment 5, inactive user equipment may report an identity of reselected EPLMN by a new RRC Procedure. As shown in FIG. 7, a corresponding information reporting procedure may include the following steps:

Step 71: Inactive UE monitors whether reselection of PLMN occurs, and whether RNA update conditions are met, where when PLMN reselects to EPLMN, or PLMN reselects to EPLMN and RNA update conditions are met simultaneously, UE may initiate a new RRC Procedure to a base station.

Step 72: If PLMN reselects to EPLMN, or PLMN reselects to EPLMN and RNA update conditions are met simultaneously, then UE sends New RRC message_4 to the base station; where, the New RRC message_4 carries reselected EPLMN ID at least.

Step 73: The base station replies to UE New RRC message_5 in response to New RRC message_4, or an RRC Release message (MSG4, same as the mechanism of corresponding technologies) that carries suspend information, and UE keeps an RRC inactive mode.

Figure 8:
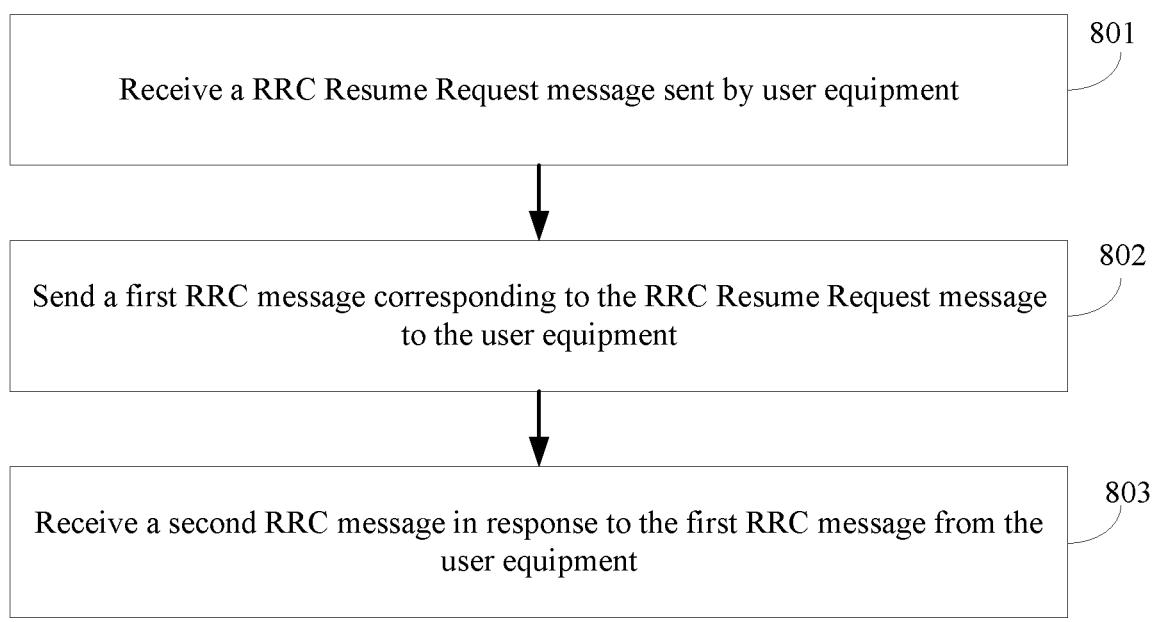
FIG. 8 is a first flowchart of an information receiving method according to an embodiment of the present disclosure.

As shown in FIG. 8, the embodiments of the present disclosure also provides an information receiving method, applied to a network device, and the method includes the following steps:

Step 801: Receive an RRC Resume Request message sent by user equipment

Step 802: Send a first RRC message corresponding to the RRC Resume Request message to the user equipment.

Step 803: Receive a second RRC message sent by the user equipment in response to the first RRC message.

In a case that user equipment is in an inactive mode, PLMN reselects to EPLMN, or PLMN reselects to EPLMN and RNA update conditions are met, the second RRC message carries the identity of EPLMN.

In the embodiments of this present disclosure, an RRC Resume Procedure is initiated through user equipment, when PLMN reselects to EPLMN, or PLMN reselects to EPLMN and RNA update conditions are met, user equipment may report the identity of reselected EPLMN by RRC information reporting, so as to report the identity of reselected EPLMN to the network device even though PLMN reselects to EPLMN and RNA update conditions are met simultaneously in a case that user equipment is in an inactive mode, namely, in the case of any reselection of PLMN to EPLMN, the identity of reselected EPLMN can be reported so as to ensure the network device may timely obtain the identity of reselected EPLMN to ensure related communication performance.

In this specific embodiment of the present disclosure, optionally, when the RRC Resume Request message is sent by user equipment when PLMN reselects to EPLMN, or PLMN reselects to EPLMN and RNA update conditions are met at the same time;

The RRC Resume Request message carries a first cause value, which is used to indicate PLMN reselecting to EPLMN in user equipment, or PLMN reselecting to EPLMN and RNA update conditions being met;

Or, the RRC Resume Request message carries a second cause value, which is used to indicate the user equipment having uplink data transmission or uplink signaling transmission;

Or, the RRC Resume Request message carries indication information, which is used to indicate whether PLMN reselecting to EPLMN in the user equipment.

Optionally, the first RRC message is an RRC Complete message, the second RRC message is an RRC Resume Complete message;

Or, the first RRC message is an RRC Release message, which carries suspend configuration information including wireless resource configuration information, which indicates resources occupied by the second RRC information.

Optionally, when the RRC Resume Request message carries the first cause value,
  which is determined by Non-Access Stratum (NAS) of the user equipment, and is provided to AS when NAS provides the identity of reselected EPLMN to Access Stratum (AS);

Or, the first cause value is determined by AS of the user equipment after NAS provides the identity of reselected EPLMN to AS.

Optionally, when the RRC Resume Request message carries the second cause value,
  which is determined by NAS of the user equipment, and is provided to AS when NAS provides the identity of reselected EPLMN to AS;
  or, the second cause value is determined by NAS in the user equipment, and is provided to AS while providing a reselected identity of EPLMN to S, meanwhile, triggers NAS signaling process;
  or, the second cause value is determined by AS of the user equipment after NAS provides the identity of reselected EPLMN to AS.

Optionally, the RRC Resume Request message is sent by the user equipment when RNA update conditions are met; the first RRC message is sent on the condition that the network device judges the list of PLMN of cell broadcast to be restored excludes RPLMN of the user equipment.

As shown in FIG. 9, the embodiments of the present disclosure also provides an information receiving method, applied to a network device, and the method includes the following steps:

Step 901: Receive a third RRC message that carries the identity of EPLMN when PLMN reselects to EPLMN, or PLMN reselects to EPLMN and RNA update conditions are met in a case that user equipment is in an inactive mode.

Optionally, the third RRC message further carries at least one of the following information:
  user equipment identifier, MAC-I and truncated MAC-I.
  Optionally, after step 901, the method further includes:
  sending a fourth RRC message or RRC Release message corresponding to the third RRC message to the user equipment.

In this way, when PLMN reselects to EPLMN, or PLMN reselects to EPLMN and RNA update conditions are met at the same time in a case that user equipment is in an inactive mode, it can be realized that the identity of reselected EPLMN is reported by an RRC message directly, so as to reduce signaling overheads, ensure communication performance under the condition of meeting the report requirements of identity of reselected EPLMN.

The information reporting method and receiving method in the present disclosure is described in the foregoing embodiment. User equipment and network device in the present disclosure is described below with reference to embodiments and accompanying drawings.

Referring to FIG. 10, an embodiment of this disclosure further provides user equipment 10, including:
- a first sending module 11, configured to send an RRC Resume Request message to a network device;
- a first receiving module 12, configured to receive a first RRC message sent by the network device in response to the RRC Resume Request message; and
- a second sending module 13, configured to send a second RRC message in response to the first RRC message to the network device, where
- in a case that user equipment is in an inactive mode, when PLMN reselects to EPLMN, or PLMN reselects to EPLMN and RNA update conditions are met, the second RRC message carries the identity of EPLMN.

In the embodiments of this present disclosure, an RRC Resume Procedure is initiated through user equipment, when PLMN reselects to EPLMN, or PLMN reselects to EPLMN and RNA update conditions are met, user equipment may report the identity of reselected EPLMN by RRC information reporting, so as to report the identity of reselected EPLMN to the network device even though PLMN reselects to EPLMN and RNA update conditions are met simultaneously in a case that user equipment is in an inactive mode, namely, in the case of any reselection of PLMN to EPLMN, the identity of reselected EPLMN can be reported so as to ensure the network device may timely obtain the identity of reselected EPLMN to ensure related communication performance.

In this specific embodiment of the present disclosure, optionally, when the RRC Resume Request message is sent by user equipment when PLMN reselects to EPLMN, or PLMN reselects to EPLMN and RNA update conditions are met at the same time;

The RRC Resume Request message carries a first cause value, which is used to indicate PLMN reselecting to EPLMN in user equipment, or PLMN reselecting to EPLMN and RNA update conditions being met;
- or, the RRC Resume Request message carries a second cause value, which is used to indicate the user equipment having uplink data transmission or uplink signaling transmission;
- or, the RRC Resume Request message carries indication information, which is used to indicate whether PLMN reselecting to EPLMN in the user equipment.

Optionally, the first RRC message is an RRC Resume message, and the second RRC message is an RRC Resume Complete message;

Or, the first RRC message is an RRC Release message, which carries suspend configuration information including wireless resource configuration information, which indicates resources occupied by the second RRC information.

Optionally, when the RRC Resume Request message carries the first cause value,
  which is determined by Non-Access Stratum (NAS) of the user equipment, and is provided to AS when NAS provides the identity of reselected EPLMN to Access Stratum (AS);
  or, the first cause value is determined by AS of the user equipment after NAS provides the identity of reselected EPLMN to AS.

Optionally, when the RRC Resume Request message carries the second cause value,
  which is determined by NAS of the user equipment, and is provided to AS when NAS provides the identity of reselected EPLMN to AS;
  or, the second cause value is determined by NAS of the user equipment, and is provided to AS while providing a reselected identity of EPLMN to AS, meanwhile, triggers NAS signaling process;
  or, the second cause value is determined by AS of the user equipment after NAS provides the identity of reselected EPLMN to AS.

Optionally, the RRC Resume Request message is sent by the user equipment when RNA update conditions are met;

The first RRC message is sent on the condition that the network device judges the list of PLMN of cell broadcast to be restored excludes RPLMN of the user equipment.

As shown in FIG. 11, the embodiments of the present disclosure also provides user equipment 110, including:
- a third sending module 111, configured to: in a case that user equipment is in an inactive mode, when PLMN reselects to EPLMN, or PLMN reselects to EPLMN and RNA update conditions are met, send a third RRC message that carries the identity of EPLMN to the network device.

Optionally, the third RRC message further carries at least one of the following information:
  user equipment identifier, MAC-I and truncated MAC-I.

Optionally, the user equipment further includes:
- a fifth receiving module, configured to receive a fourth RRC message or RRC Release message sent by the network device in response to the third RRC message.

In this way, when PLMN reselects to EPLMN, or PLMN reselects to EPLMN and RNA update conditions are met at the same time in a case that user equipment is in an inactive mode, it can be realized that the identity of reselected EPLMN is reported by an RRC message directly, so as to reduce signaling overheads, ensure communication performance under the condition of meeting the report requirements of identity of reselected EPLMN.

Figure 12:
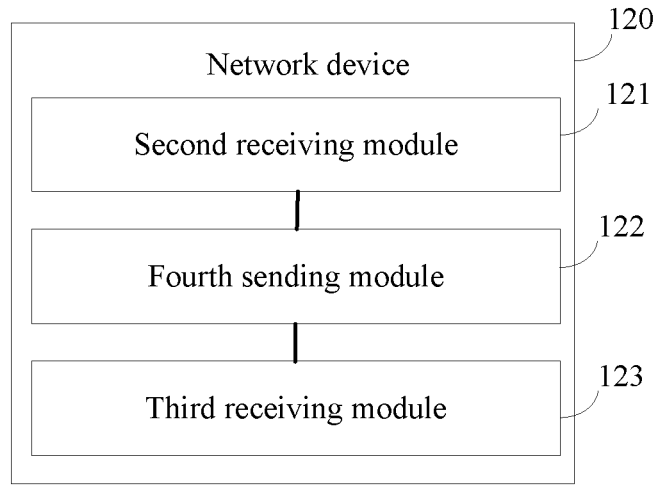
FIG. 12 is a first schematic diagram of a network device according to an embodiment of the present disclosure.

As shown in FIG. 12, the embodiments of the present disclosure also provides a network device 120, including:
- a second receiving module 121, configured to receive an RRC Resume Request message sent by user equipment;
- a fourth sending module 122, configured to send a first RRC message in response to the RRC Resume Request message to the user equipment; and
- a third receiving module 123, configured to receive a second RRC message sent by the user equipment in response to the first RRC message, where
- in a case that user equipment is in an inactive mode, when PLMN reselects to EPLMN, or PLMN reselects to EPLMN and RNA update conditions are met, the second RRC message carries the identity of EPLMN.

Optionally, the RRC Resume Request message is sent by the user equipment when PLMN reselects to EPLMN, or PLMN reselects to EPLMN and RNA update conditions are met simultaneously.

The RRC Resume Request message carries a first cause value, which is used to indicate PLMN reselecting to EPLMN in user equipment, or PLMN reselecting to EPLMN and RNA update conditions being met;
  or, the RRC Resume Request message carries a second cause value, which is used to indicate the user equipment having uplink data transmission or uplink signaling transmission;

or, the RRC Resume Request message carries indication information, which is used to indicate whether PLMN reselecting to EPLMN in the user equipment.

Optionally, the first RRC message is an RRC Resume message, the second RRC message is an RRC Resume Complete message;

or, the first RRC message is an RRC Release message, which carries suspend configuration information including wireless resource configuration information, which indicates resources occupied by the second RRC information.

Optionally, when the RRC Resume Request message carries the first cause value, which is determined by Non-Access Stratum (NAS) of the user equipment, and is provided to AS when NAS provides the identity of reselected EPLMN to Access Stratum (AS);

or, the first cause value is determined by AS of the user equipment after NAS provides the identity of reselected EPLMN to AS.

Optionally, when the RRC Resume Request message carries the second cause value, which is determined by NAS of the user equipment, and is provided to AS when NAS provides the identity of reselected EPLMN to AS;

or, the second cause value is determined by NAS of the user equipment, and is provided to AS while providing a reselected identity of EPLMN to AS, meanwhile, triggers NAS signaling process;

or, the second cause value is determined by AS of the user equipment after NAS provides the identity of reselected EPLMN to AS.

Optionally, the RRC Resume Request message is sent by the user equipment when RNA update conditions are met.

The first RRC message is sent on the condition that the network device judges the list of PLMN of cell broadcast to be restored excludes RPLMN of the user equipment.

Figure 13:
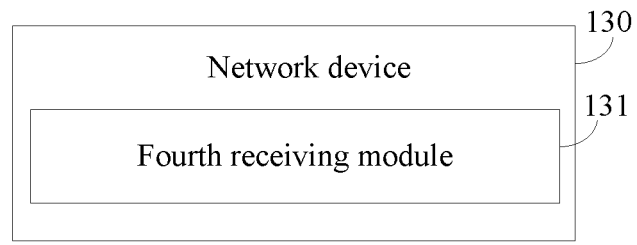
FIG. 13 is a second schematic diagram of a network device according to an embodiment of the present disclosure.

As shown in FIG. 13, the embodiments of the present disclosure also provides a network device 130, including:

a fourth receiving module 131, configured to receive a third RRC message that carries the identity of EPLMN from user equipment that is in an inactive mode when PLMN reselects to EPLMN, or PLMN reselects to EPLMN and RNA update conditions are met.

Optionally, the third RRC message further carries at least one of the following information:

user equipment identifier, MAC-I and truncated MAC-I.

Optionally, the network device 130 further includes:

a fifth sending module, configured to send a fourth RRC message or RRC Release message to the user equipment in response to the third RRC message.

In this way, when PLMN reselects to EPLMN, or PLMN reselects to EPLMN and RNA update conditions are met at the same time in a case that user equipment is in an inactive mode, it can be realized that the identity of reselected EPLMN is reported by an RRC message directly, so as to reduce signaling overheads, ensure communication performance under the condition of meeting the report requirements of identity of reselected EPLMN.

An embodiment of the present disclosure further provides user equipment, including a processor, a memory, and a computer program stored in the memory and executable on the processor, where the program, when executed by the processor, implements steps of the information reporting method applied to user equipment and the same technical effect can be achieved. To avoid repetition, details are not described herein again.

Figure 14:
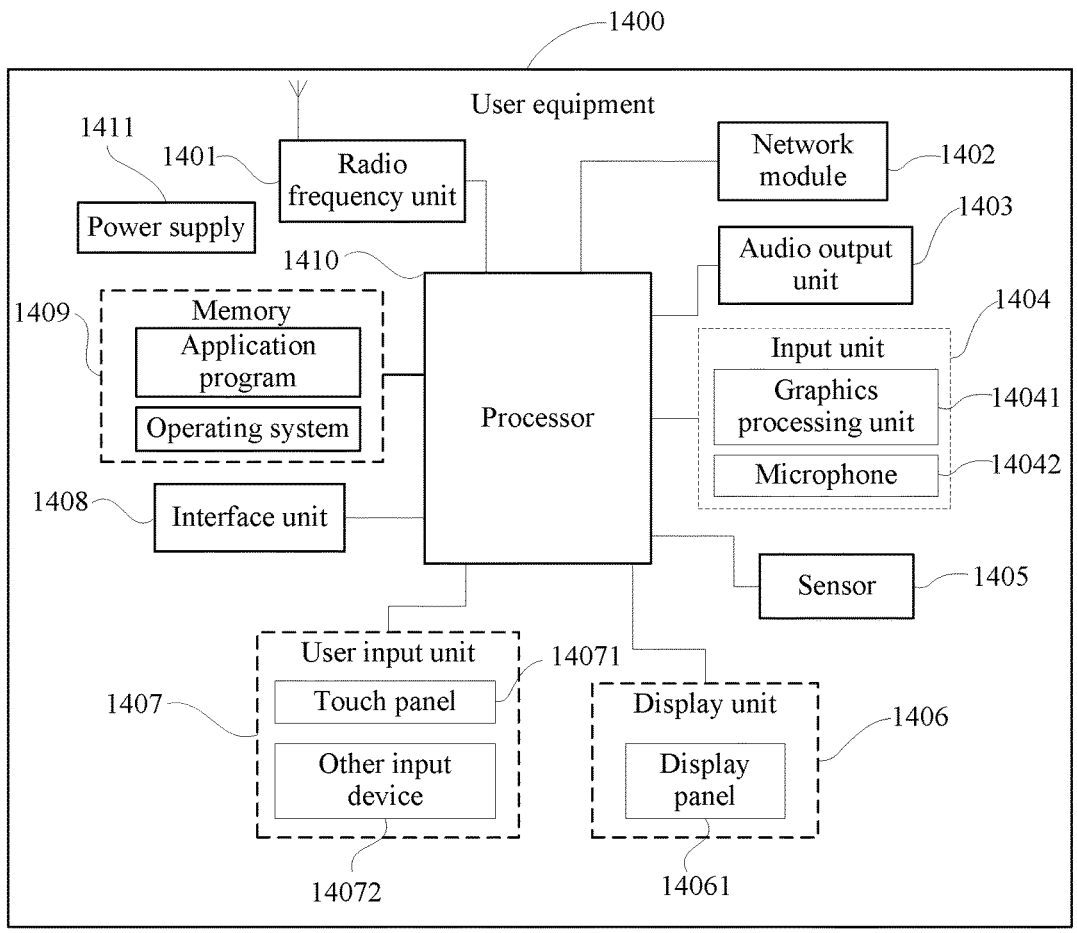
FIG. 14 is a third schematic diagram of user equipment according to an embodiment of the present disclosure.

Specifically, FIG. 14 is a schematic structural diagram of hardware of user equipment implementing embodiments of the present disclosure. The user equipment 1400 includes but is not limited to: a radio frequency unit 1401, a network module 1402, an audio output unit 1403, an input unit 1404, a sensor 1405, a display unit 1406, a user input unit 1407, an interface unit 1408, a memory 1409, a processor 1410, a power supply 1411, and other components. A person skilled in the art may understand that the structure of the user equipment shown in FIG. 14 does not constitute a limitation to the user equipment. The user equipment may include more or fewer components than those shown in the figure, or some components may be combined, or there may be a different component arrangement. In this embodiment of the present disclosure, user equipment includes, but is not limited to, a mobile phone, a tablet computer, a notebook computer, a palmtop computer, vehicle-mounted user equipment, a wearable device, a pedometer, or the like.

The radio frequency unit 1401 is configured to send an RRC Resume Request message to a network device, receive a first RRC message sent by the network device in response to the RRC Resume Request message, send a second RRC message in response to the first RRC message to the network device; when PLMN reselects to EPLMN, or PLMN reselects to EPLMN and RNA update conditions are met at the same time in a case that user equipment is in an inactive mode, the second RRC message carries the identity of EPLMN.

Or, the radio frequency unit 1401 is configured to send a third RRC message that carries the identity of EPLMN to the network device when PLMN reselects to EPLMN, or PLMN reselects to EPLMN and RNA update conditions are met at the same time in a case that user equipment is in an inactive mode.

In the embodiments of this present disclosure, an RRC Resume Procedure is initiated through user equipment 1400, when PLMN reselects to EPLMN, or PLMN reselects to EPLMN and RNA update conditions are met at the same time, the user equipment 1400 may report the identity of reselected EPLMN by RRC information reporting, so as to report the identity of reselected EPLMN to the network device even though PLMN reselects to EPLMN and RNA update conditions are met simultaneously in a case that user equipment is in an inactive mode, namely, in the case of any reselection of PLMN to EPLMN, the identity of reselected EPLMN can be reported so as to ensure the network device may timely obtain the identity of reselected EPLMN to ensure related communication performance.

It can be understood that in this embodiment of the present disclosure, the radio frequency unit 1401 can be used to receive or send information or receive or send signals during calls. Specifically, after receiving downlink data from a base station, send to the processor 1410 for processing; besides, send uplink data to a base station. Generally, the radio frequency unit 1401 includes but is not limited to an antenna, at least one amplifier, a transceiver, a coupler, a low noise amplifier, a duplexer, and the like. In addition, the radio frequency unit 1401 may further communicate with a network and another device by using a wireless communication system.

The user equipment provides a user with wireless broadband Internet access through the network module 1402, for example, helps the user send and receive emails, browse web pages, and access streaming media.

The audio output unit 1403 may convert audio data received by the radio frequency unit 1401 or the network module 1402 or stored in the memory 1409 into an audio signal, and output the audio signal as sound. In addition, the audio output unit 1403 may further provide audio output (for example, call signal receiving sound or message receiving sound) related to a specific function performed by the user equipment 1400. The audio output unit 1403 includes a loudspeaker, a buzzer, a telephone receiver, and the like.

The input unit 1404 is configured to receive audio or radio signals. The input unit 1404 may include a Graphics Processing Unit (GPU) 14041 and a microphone 14042. The graphics processing unit 14041 processes image data of a static image or video obtained by an image capture apparatus (such as, a camera) in a video capture mode or an image capture mode. A processed image frame can be displayed on the display unit 1406. The image frames processed by the GPU 14041 can be stored in the memory 1409 (or another storage medium) or sent by the radio frequency unit 1401 or the network module 1402. The microphone 14042 may receive sound and can process the sound into audio data. The processed audio data can be converted into a format that can be sent to a mobile communications base station through the radio frequency unit 1401 in a telephone call mode, for outputting.

The user equipment 1400 further includes at least one sensor 1405, for example, a light sensor, a motion sensor, and other sensors. Specifically, the light sensor includes an ambient light sensor and a proximity sensor, where the ambient light sensor can adjust brightness of the display panel 14061 based on brightness of ambient light, and the proximity sensor can turn off the display panel 14061 and/or backlight when the user equipment 1400 moves towards the ear. As a motion sensor, an accelerometer sensor can detect magnitude of acceleration in various directions (usually three axes), can detect magnitude and the direction of gravity when stationary, and can be configured for identification of user equipment postures (such as horizontal and vertical screen switch, related games, and magnetometer posture calibration), vibration identification of related functions (such as the pedometer and percussion), and the like. The sensor 1405 may further include a fingerprint sensor, a pressure sensor, an iris sensor, a molecular sensor, a gyroscope, a barometer, a hygrometer, a thermometer, an infrared sensor, or the like. Details are not described herein.

The display unit 1406 is configured to display information entered by a user or information provided for the user. The display unit 1406 may include the display panel 14061, and the display panel 14061 may be configured in a form of a Liquid Crystal Display (LCD), an Organic Light-Emitting Diode (OLED), or the like.

The user input unit 1407 can be configured to receive input numeric or character information, and generate key signal inputs related to user settings and function control of the user equipment. Specifically, the user input unit 1407 includes a touch panel 14071 and another input device 14072. The touch panel 14071, also called a touch screen, can collect a touch operation of the user on or near the touch panel 14071 (For example, the user uses any suitable object or accessory such as a finger or a stylus to operate on or near the touch panel 14071). The touch panel 14071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1410, and receives and executes a command from the processor 1410. In addition, the touch panel 14071 may be implemented by using a plurality of types such as a resistive type, a capacitive type, an infrared ray, and a surface acoustic wave. In addition to the touch panel 14071, the user input unit 1407 may further include the another input device 14072. Specifically, the other input devices 14072 may include but are not limited to a physical keyboard, function keys (such as a volume control key and an on/off key), a trackball, a mouse, and a joystick. Details are not described herein.

Further, the touch panel 14071 may cover the display panel 14061. After detecting the touch operation on or near the touch panel 14071, the touch panel 14071 transmits the touch operation to the processor 1410 to determine a type of a touch event, and then the processor 1410 provides corresponding visual output on the display panel 14061 based on the type of the touch event. Although in FIG. 14, the touch panel 14071 and the display panel 14061 are configured as two independent components to implement input and output functions of the user equipment, in some embodiments, the touch panel 14071 and the display panel 14061 can be integrated to implement the input and output functions of the user equipment. Details are not limited herein.

The interface unit 1408 is an interface for connecting an external apparatus to the user equipment 1400. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 1408 can be configured to receive input (for example, data information and power) from the external apparatus and transmit the received input to one or more elements in the user equipment 1400, or transmit data between the user equipment 1400 and the external apparatus.

The memory 1409 can be configured to store software programs and various data. The memory 1409 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 1409 may include a high-speed random access memory or a nonvolatile memory, for example, at least one disk storage device, a flash memory, or another volatile solid-mode storage device.

The processor 1410 is a control center of the user equipment. The processor 1410 uses various interfaces and lines to connect the various parts of the entire user equipment, and performs various functions of the user equipment and processes data by running or executing software programs and/or modules stored in the memory 1409 and invoking data stored in the memory 1409, to monitor the user equipment as a whole. The processor 1410 may include one or more processing units. Optionally, the processor 1410 may be integrated with an application processor and a modem processor. The application processor mainly processes the operating system, the user interface, applications, etc. The modem processor mainly processes wireless communication. It can be understood that the foregoing modem processor may not be integrated into the processor 1410.

The user equipment 1400 may also include a power supply 1411 (for example, a battery) that supplies power to various components. Optionally, the power supply 1411 may be logically connected to the processor 1410 through a power supply management system, to perform functions of managing charging, discharging, and power consumption through the power supply management system.

In addition, the user equipment 1400 may further include some functional modules not shown. Details are not described herein again.

An embodiment of the present disclosure further provides a network device, including a processor, a memory, and a computer program stored in the memory and executable on the processor, where the program, when executed by the processor, implements steps of the information reporting method applied to a network device and the same technical effect can be achieved. To avoid repetition, details are not described herein again.

Figure 15:
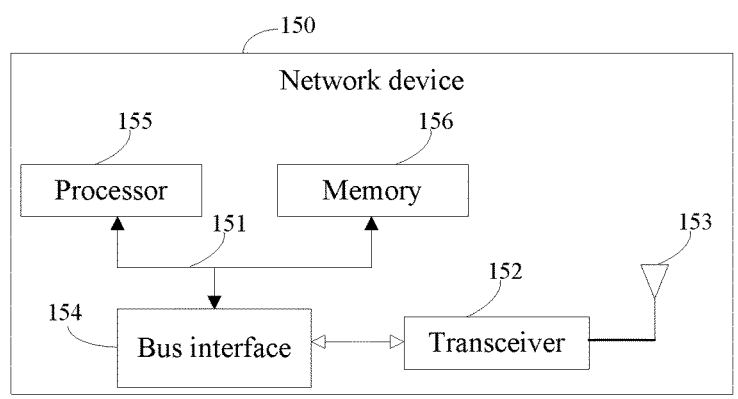
FIG. 15 is a third schematic diagram of a network device according to an embodiment of the present disclosure.

Specifically, FIG. 15 is a schematic diagram of a hardware structure of a network device according to various embodiments of the present disclosure. The network device 150 includes but is not limited to a bus 151, a transceiver 152, an antenna 153, a bus interface 154, a processor 155, and a memory 156.

In this embodiment of the present disclosure, the network device 150 further includes: a computer program stored in the memory 156 and executable on the processor 155. Optionally, when the computer program is executed by the processor 155, the following step may be further implemented:

controlling the transceiver 152 to receive an RRC Resume Request message sent by user equipment, send a first RRC message in response to the RRC Resume Request message to the user equipment, and receive a second RRC message in response to the first RRC message from the user equipment, where in a case that user equipment is in an inactive mode, when PLMN reselects to EPLMN, or PLMN reselects to EPLMN and RNA update conditions are met, the second RRC message carries the identity of EPLMN.

Optionally, when the computer program is executed by the processor 155, the following step may be further implemented:

controlling the transceiver 152 to receive a third RRC message that carries the identity of EPLMN from user equipment when PLMN reselects to EPLMN, or PLMN reselects to EPLMN and RNA update conditions are met at the same time in a case that user equipment is in an inactive mode.

The transceiver 152 is configured to receive and send data under control of the processor 155.

In FIG. 15, for a bus architecture (represented by the bus 151), the bus 151 may include any quantity of interconnecting buses and bridges, and the bus 151 interconnects various circuits of one or more processors represented by the processor 155 and a memory represented by the memory 156. The bus 151 may further link together various other circuits, such as a peripheral device, a voltage regulator, and a power management circuit. These are all well known in the art. Therefore, this specification provides no further description. The bus interface 154 provides an interface between the bus 151 and the transceiver 152. The transceiver 152 may be one or more elements, for example, a plurality of receivers and transmitters, and provides a unit that is configured to communicate with various other apparatuses on a transmission medium. Data processed by the processor 155 is transmitted on a radio medium by using the antenna 153. The antenna 153 further receives data and transmits the data to the processor 155.

The processor 155 is responsible for managing the bus 151 and general processing, and may further provide various functions, including timing, peripheral interfacing, voltage regulation, power management, and another control function. The memory 156 may be configured to store data used by the processor 155 when performing an operation.

Optionally, the processor 155 may be a CPU, an ASIC, an FPGA, or a CPLD.

An embodiment of the present disclosure further provides a computer readable storage medium, storing a computer program, where the program, when executed by the processor, implements steps of the information reporting method applied to user equipment and the same technical effect can be achieved. To avoid repetition, details are not described herein again. The computer readable storage medium is, for example, a Read-Only Memory (ROM), a Random Access Memory (RAM), a magnetic disk, or an optical disc.

An embodiment of the present disclosure further provides a computer readable storage medium, storing a computer program, where the program, when executed by the processor, implements steps of the information receiving method applied to a network device and the same technical effect can be achieved. To avoid repetition, details are not described herein again. The computer readable storage medium is, for example, a Read-Only Memory (ROM), a Random Access Memory (RAM), a magnetic disk, or an optical disc.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. In the absence of more limitations, an element defined by "including a . . . " does not preclude the existence of other identical elements in the process, method, article, or apparatus that includes the element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing user equipment (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

The invention claimed is:

1. An information reporting method, performed by user equipment and comprising:

sending a Radio Resource Control (RRC) Resume Request message to a network device;

receiving a first RRC message sent by the network device in response to the RRC Resume Request message; and sending a second RRC message in response to the first RRC message to the network device, wherein in a case that the user equipment is in an inactive mode, when a public land mobile network (PLMN) is reselected to an equivalent public land mobile network (EPLMN), or when PLMN is reselected to EPLMN and a RNA update condition is met, the second RRC message carries the identity information of EPLMN, wherein the RRC Resume Request message is sent by the user equipment when PLMN is reselected to EPLMN, or PLMN is reselected to EPLMN and a RNA update condition is met;

the RRC Resume Request message carries a cause value, which is used to indicate the user equipment has uplink data transmission or uplink signaling transmission;

the cause value is determined by NAS of the user equipment, and is provided to AS when NAS provides the identity information of reselected EPLMN to Access Stratum (AS), and triggers NAS signaling process, wherein the NAS signaling process comprises a mobile registration update process.

2. The method according to claim 1, wherein the first RRC message is an RRC Resume message, and the second RRC message is an RRC Resume Complete message;

or the first RRC message is an RRC release message, which carries suspend configuration information including radio resource configuration information, which indicates resources occupied by the second RRC message.

3. The method according to claim 1, wherein the RRC Resume Request message is sent by the user equipment when a RNA update condition is met;

the first RRC message is sent on the condition that the network device judges the list of PLMN of cell broadcast to be restored excludes RPLMN of the user equipment.

4. The method according to claim 1, wherein the user equipment is in the inactive mode when sending the RRC Resume Request message to the network device.

5. The method according to claim 1, further comprising:

before sending the RRC Resume Request message to the network device, monitoring, by the user equipment, whether the PLMN is reselected to EPLMN, and the RNA update condition is met.

6. The method according to claim 1, wherein the cause value is determined as mo-singalling or mo-data.

7. An information receiving method, performed by a network device and comprising:

receiving an RRC Resume Request message sent by user equipment;

sending a first RRC message in response to the RRC Resume Request message to the user equipment; and receiving a second RRC message sent by the user equipment in response to the first RRC message, wherein in a case that user equipment is in an inactive mode, when PLMN is reselected to EPLMN, or PLMN is reselected to EPLMN and a RNA update condition is met, the second RRC message carries the identity information of EPLMN, wherein the RRC Resume Request message is sent by the user equipment when PLMN is reselected to EPLMN, or PLMN is reselected to EPLMN and a RNA update condition is met;

the RRC Resume Request message carries a cause value, which is used to indicate the user equipment has uplink data transmission or uplink signaling transmission;

the cause value is determined by NAS of the user equipment, and is provided to AS when NAS provides the identity information of reselected EPLMN to AS, and triggers NAS signaling process, wherein the NAS signaling process comprises a mobile registration update process.

8. The method according to claim 7, wherein the first RRC message is an RRC Resume message, and the second RRC message is an RRC Resume Complete message;

or the first RRC message is an RRC release message, which carries suspend configuration information including radio resource configuration information, which indicates resources occupied by the second RRC message.

9. The method according to claim 7, wherein the RRC Resume Request message is sent by the user equipment when the RNA update condition is met; and the first RRC message is sent on the condition that the network device judges the list of PLMN of cell broadcast to be restored excludes RPLMN of the user equipment.

10. The method according to claim 7, wherein the cause value is determined as mo-singalling or mo-data.

11. User equipment, comprising a memory, a processor, and a program stored in the memory and executable on the processor, wherein the program, when executed by the processor, implements following steps:

sending a Radio Resource Control (RRC) Resume Request message to a network device;

receiving a first RRC message sent by the network device in response to the RRC Resume Request message; and sending a second RRC message in response to the first RRC message to the network device, wherein in a case that the user equipment is in an inactive mode, when a public land mobile network (PLMN) is reselected to an equivalent public land mobile network (EPLMN), or when PLMN is reselected to EPLMN and a RNA update condition is met, the second RRC message carries the identity information of EPLMN, wherein the RRC Resume Request message is sent by the user equipment when PLMN is reselected to EPLMN, or PLMN is reselected to EPLMN and a RNA update condition is met;

the RRC Resume Request message carries a cause value, which is used to indicate the user equipment has uplink data transmission or uplink signaling transmission;

the cause value is determined by NAS of the user equipment, and is provided to AS when NAS provides the identity information of reselected EPLMN to AS, and triggers NAS signaling process, wherein the NAS signaling process comprises a mobile registration update process.

12. The user equipment according to claim 11, wherein the first RRC message is an RRC Resume message, and the second RRC message is an RRC Resume Complete message;

or the first RRC message is an RRC release message, which carries suspend configuration information including radio resource configuration information, which indicates resources occupied by the second RRC message.

13. The user equipment according to claim 11, wherein the RRC Resume Request message is sent by the user equipment when the RNA update condition is met;

the first RRC message is sent on the condition that the network device judges the list of PLMN of cell broadcast to be restored excludes RPLMN of the user equipment.

14. The user equipment according to claim 11, wherein the user equipment is in the inactive mode when sending the RRC Resume Request message to the network device.

15. The user equipment according to claim 11, wherein the program, when executed by the processor, implements a following step:
before sending the RRC Resume Request message to the network device, monitoring whether the PLMN is reselected to EPLMN, and the RNA update condition is met.

16. The user equipment according to claim 11, wherein the cause value is determined as mo-singalling or mo-data.

17. A network device, comprising a memory, a processor, and a program stored in the memory and executable on the processor, wherein the program, when executed by the processor, implements steps of the information reporting method according to claim 7.

18. The network device according to claim 17, wherein the RRC Resume Request message is sent by the user equipment when the RNA update condition is met; and
the first RRC message is sent on the condition that the network device judges the list of PLMN of cell broadcast to be restored excludes RPLMN of the user equipment.

19. The network device according to claim 17, wherein the cause value is determined as mo-singalling or mo-data.

20. The network device according to claim 17, wherein the first RRC message is an RRC Resume message, and the second RRC message is an RRC Resume Complete message;
or
the first RRC message is an RRC release message, which carries suspend configuration information including radio resource configuration information, which indicates resources occupied by the second RRC message.

* * * * *